United States Patent

Bergler

[11] Patent Number: 4,621,427
[45] Date of Patent: Nov. 11, 1986

[54] GUIDE DEVICE FOR A MOBILE WORKING TOOL

[75] Inventor: Otto Bergler, Mühlacker-Lomersheim, Fed. Rep. of Germany

[73] Assignee: Black & Decker Overseas AG, Vaduz, Liechtenstein

[21] Appl. No.: 723,059

[22] Filed: Apr. 15, 1985

[30] Foreign Application Priority Data

Apr. 13, 1984 [DE] Fed. Rep. of Germany ....... 3413928

[51] Int. Cl.$^4$ .............................................. B26B 3/00
[52] U.S. Cl. ...................................... 30/481; 30/300; 30/310
[58] Field of Search ........................ 30/481, 310, 300

[56] References Cited

U.S. PATENT DOCUMENTS

| | | | |
|---|---|---|---|
| 123,201 | 1/1872 | Schloemer | 30/310 |
| 318,333 | 5/1885 | Warden | 30/310 |
| 660,211 | 10/1900 | Durkel | 30/310 |
| 707,281 | 8/1902 | Traut | 30/481 |
| 778,921 | 1/1905 | Traut | 30/481 |
| 1,719,663 | 7/1929 | Koontz | 30/300 |
| 1,924,717 | 8/1933 | Hall | 30/300 |
| 1,956,275 | 4/1934 | Cook | 30/481 |

FOREIGN PATENT DOCUMENTS

| | | | |
|---|---|---|---|
| 13458 | of 1902 | United Kingdom | 30/310 |
| 30266 | of 1910 | United Kingdom | 30/310 |
| 958 | of 1910 | United Kingdom | 30/310 |
| 681329 | 10/1952 | United Kingdom | 30/310 |

Primary Examiner—Frederick R. Schmidt
Assistant Examiner—Joseph T. Zatarga
Attorney, Agent, or Firm—Burns, Doane, Swecker & Mathis

[57] ABSTRACT

A guide device for a tool such as a manual planing machine or a manual milling machine comprises a compass point connected to the tool by several guide rods. Curving or circular working processes are possible with this guide device. The compass point is preferably supported in a connecting piece connected to the guide rods, with the guide rods passing through the housing of the working tool. A sliding block additionally arranged on the guide rods carries the weight of the working tool and assures a constant, uniform working depth. When processing edges, the guide rods connected with the working tool may be mounted on an angle piece, which by means of further rods is connected with the connecting piece carrying the compass point.

12 Claims, 5 Drawing Figures

GUIDE DEVICE FOR A MOBILE WORKING TOOL

BACKGROUND AND OBJECT OF THE INVENTION

The invention relates to a guide device for a mobile working tool, in particular, a manual planing machine or a manual milling machine.

Guide devices of this type are known in numerous configurations, all of which being capable of guiding the working tool along a straight line in the advance direction, so that for example, the working of the edge of a workpiece is possible.

It has not been possible heretofore, however, to guide a working tool in a manner such that it would be capable of working curving configurations of workpieces, for example, planing profiles that are circular in their horizontal projection.

It is an object of the invention to provide a guide device whereby curving circular processing is possible.

SUMMARY OF THE INVENTION

This object is attained in the case of a guide device of the afore-mentioned type in that at least one guide rod or the like is attached to the workpiece, the guide rod being operably connected with a compass point to be placed on a support, in particular, onto the workpiece to be processed.

In actual applications of the novel guide device, the compass point is pressed against a reference surface which, as a rule, comprises the workpiece to be processed. The working tool is connected with the compass point by means of the guide rod and may be pivoted, whereby the working tool describes a circle or part of a circle, the center whereof is the compass point. It is possible thereby to plane or mill profiles of a circular or circular-arc configuration, for example, ornaments, edges of wooden plates, doors with circular top edges, or the like.

In an advantageous embodiment, the housing of the working tool is provided preferably with a continuous orifice, arranged transversely to the direction of advance, wherein the guide rod may be inserted and fastened. This embodiment yields a particularly stable mounting of the guide rod in the working tool, in particular, if the orifice is continuous the guide rod may thereby be inserted over the entire depth of the housing of the working tool. Preferably, both the guide rod and the orifice provided in the housing of the working tool have circular cross-sections. It is advantageous to mount the guide rod in the orifice of the housing of the working tool releasably and not in a fixed manner, such as for example by a pressfit. It is particularly appropriate to provide one or several threaded bolts, the axis of which extend perpendicularly to the axis of the guide rod and which tightly clamp the guide rod when screwed in. This threaded bolt may carry a screw head, but preferably it is provided with a manual handle or the like, so that it may be released or tightened without the use of tools.

The releasable mounting of the working tool has the advantage that the radius of the circle or segment of a circle to be planed or milled may be adjusted simply and very rapidly.

The stability of the guide device according to the invention is increased substantially by fastening a second guide rod to the working tool, which is connected with the compass point. This second guide rod insures that the working tool cannot be tilted in operation. It therefore makes possible the connection of the working tool with the compass tip without twisting. In principle, the second guide rod may have the same configuration as the first guide rod; it may be, for example, circular in its cross-section and may be guided through an orifice of the housing of the working tool.

If two guide rods are used, it is appropriate to provide a connecting piece, which carries the compass point and is equipped with two bore holes, into which the two guide rods may be inserted and mounted. In a manner similar to the mounting of the working tool on the guide rods, the connecting piece and thus the compass point, is joined to the guide rods securely and without twisting. Furthermore, it is not necessary to equip the guide rods with a special device to hold or fasten the compass point. The guide rods are secured in the bore holes of the connecting piece in a releasable manner, in particular, by means of threaded bolts. This releasable fastening mode yields an additional radial adjustment possibility. Appropriately, the bore holes in the connecting piece are continuous throughout, so that the connecting piece may be displaced on the guide rods as needed.

The compass point is mounted in a hole in the connecting piece, the hole extending perpendicularly to the first bore holes. A releasable fastening, in particular a threaded bolt, is advantageous, as thereby the height of the guide rods over the support or the workpiece may be adjusted.

In a further development of the invention, a sliding block is equipped with at least one bore hole and receives a rod or the like, connected with the working tool. Preferably, the rod is received releasably by means of threaded bolts, with the sliding block possessing a sliding surface which rests on a reference surface, in particular a surface on the workpiece to be processed. Thus, the block slides along the reference surface during the working processing. This sliding block essentially carries the weight of the working tool, thereby making possible a quiet and safe operation. However, the most important advantage consists of the fact that by means of the sliding block, the height of the working tool is automatically secured, so that it is not necessary to control the planing or milling depth manually. It is, therefore, possible to produce highly uniform profiles when using the sliding block. Conveniently, the already existing guide rod or rods may be used as the rods to guide the sliding block and to connect it with the working tool.

It is advantageous further to provide the sliding block in two parts, the upper part being equipped with the bore hole or bore holes and the lower one carries the sliding surface, and to interconnect those parts in a height adjustable manner. In such a case, the sliding block may be used for the setting of the working depth, as preferably it is adjustable continuously in height. An appropriate form of embodiment provides for the mounting of at least two pins on the lower part, with their upper ends projecting through and beyond bore holes of the upper part. Mounted on upper ends of the pins are plates and the like. Between the plates and the surface of the upper part, compression springs encompassing the bolts are arranged. The upper part comprises a threaded bore hole, into which preferably, a threaded bolt equipped with a manual handle is screwed, with the lower end of the threaded bolt being seated on the lower part. This threaded bolt therefore determines the height of the upper part with respect to the lower part and consequently this height may be increased and the working depth reduced, or vice versa, by the rotation of the threaded bolt.

The sliding block is arranged preferably on the guide rod or rods in the area between the working tool and the compass point. This is especially appropriate if the outer edge of a workpiece is to be processed, for example, the foot of a stand or a wooden plate. If, on the other hand, a profile is to be planed or milled into the workpiece which is not extending along the edge of the workpiece, it may be convenient to place the sliding block on the side of the working tool facing away from the compass point. This is possible, if the orifices of the working tool are continuous throughout and the guide tools are protruding from the working tool on the side facing away from the compass point. The sliding block may then be inserted and fastened onto the ends of the guide rods facing away from the compass point. This yields an especially stable mounting of the working tool, as its weight is then applied to the guide rods between two support points, i.e., the compass point and the sliding block. Obviously, it is also possible to provide two sliding blocks, one of which is fixedly mounted on the guide rods in the area between the working tool and the compass point, and the other is inserted onto and fastened to the ends of the guide rods protruding from the working tool and facing away from the compass point.

Occasionally, the problem arises that a workpiece is to be provided with a profile circular in its horizontal projection, not on its surface but at its edges. For the execution of working processes of this type an advantageous further development of the invention provides an angle piece having at least two bore holes arranged perpendicular to each other. Preferably, there are two bores in each direction for a total of four bore holes. The guide rods connected with the working tool may be inserted and preferably releasably secured through the first bore holes aligned in one direction. Further guide rods may be inserted through the second bore holes oriented perpendicularly to the first bore holes, the further guide rods being connected with the compass point. Preferably, therefore, four rods are provided, two of which are fastened as guide rods to the working tool and the angle piece. The two other rods serve to connect the angle piece with the compass point and the angle piece carrying the compass piece, respectively. The sliding block is in this case attached preferably to the second rods. It is further possible to use another, specially designed sliding block, which presses against the underside of a reference surface, e.g., the workpiece. This is possible if the orifices of the working tool are continuous throughout and the guide rods are protruding through them, so that a sliding block may be placed onto the lower ends of the guide rods, which presses from below against the reference surface and is sliding on it.

BRIEF DESCRIPTION OF THE DRAWINGS

The object and advantages of the invention will become apparent from the following detailed description of preferred embodiments thereof in connection with the accompanying drawings in which like numerals designate like elements, and in which.

DETAILED DESCRIPTION OF PREFERRED EMBODIMENTS OF THE INVENTION

Figure 1:
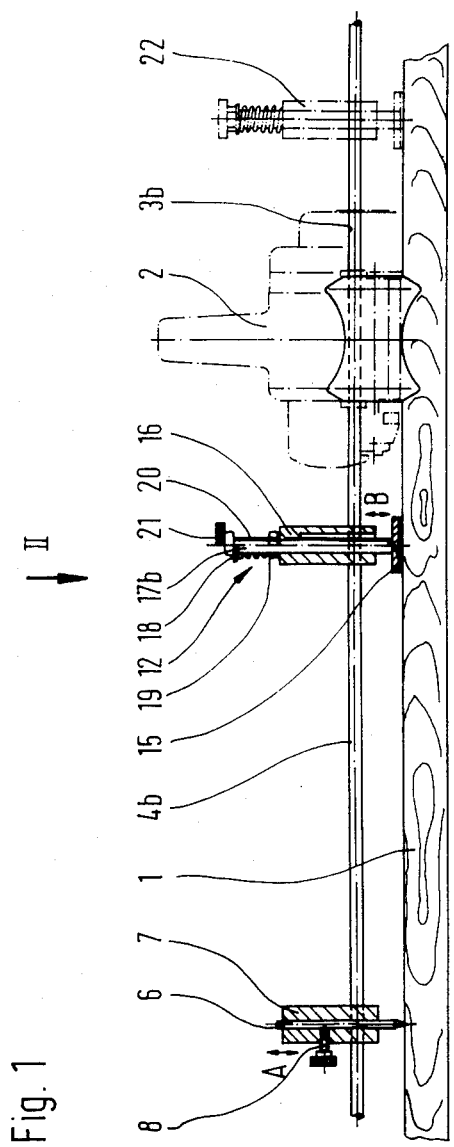
FIG. 1 is a cross-sectional view through a guide device according to the invention.

In FIG. 1, a workpiece to be processed is indicated by 1. This workpiece is to be given a circular or circular segment-shaped profile. For the processing, a working tool which in this case is a manual plane 2, is provided. The housing of this manual planing machine includes two continuous bore holes 3a and 3b (see also FIG. 2), through which are inserted guide rods 4a and 4b. The position of the manual planing machine with respect to the guide rods may be secured by means of threaded bolts 5 equipped with manual handles, with only one of the threaded bolts being shown.

The center of the circular profile to be planed is represented by a compass point 6. This compass point is secured in a bore hole of a connecting piece 7, by means of a threaded bolt 8. The compass point can therefore be continuously displaced with respect to the connecting piece 7 in a direction A (FIG. 1) perpendicular to the plane of the workpiece.

The connecting piece 7 comprises two further, horizontal bore holes 9a and 9b, through which the guide rods 4a and 5b are inserted. To immobilize these guide rods in relation to the connecting piece 7, threaded bolts 10a and 10b are provided.

Figure 2:
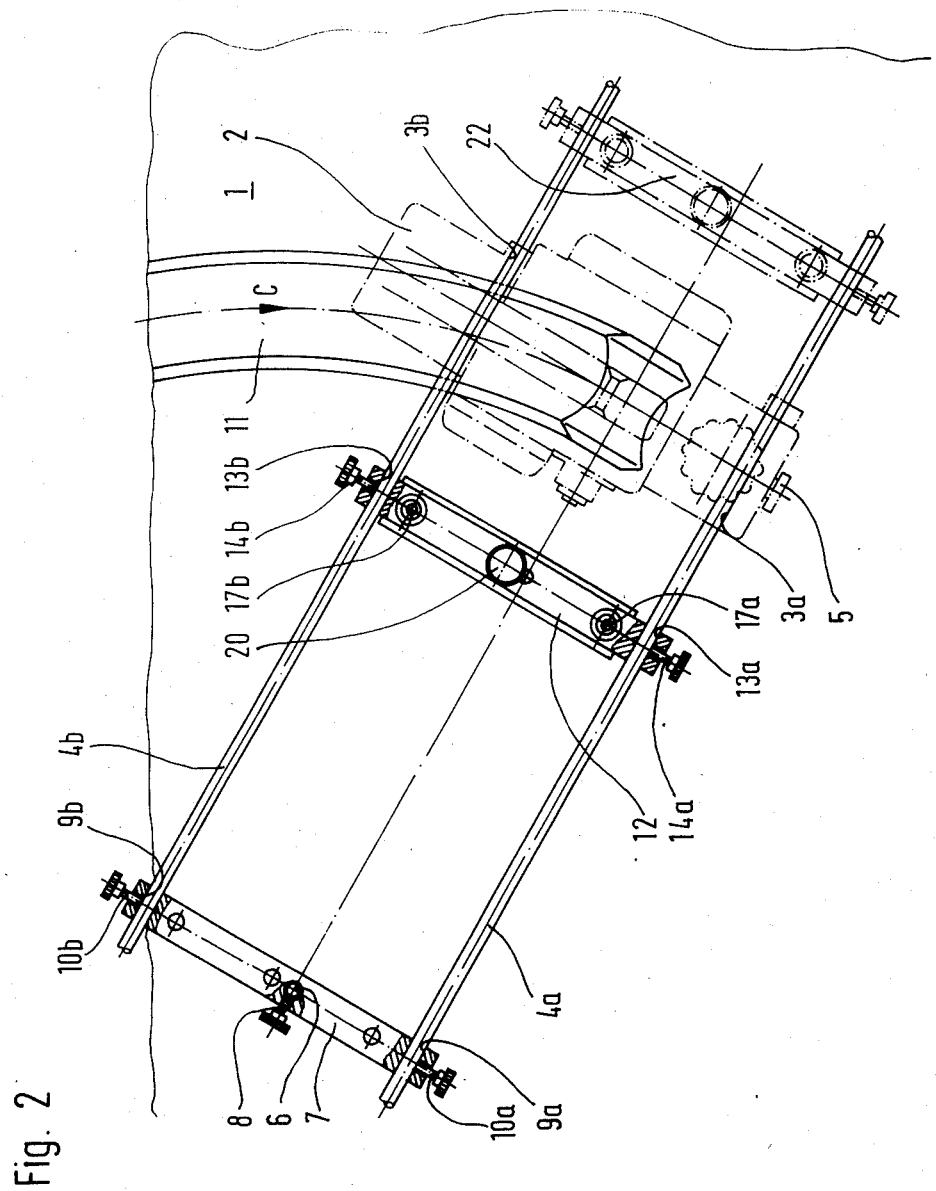
FIG. 2 is a top view of the guide device of FIG. 1 viewed in the direction of the arrow II in FIG. 1.

It is possible with this guide device to plane or mill profiles that are circular in cross-section, as indicated by the schematically represented profile 11 (FIG. 2). The two guide rods passing through the manual planing machine assure safe guidance without twisting. Since the fastening of the guide rods in relation to the manual planing machine is releasable, it is readily possible to release the manual planing machine from the guide rods and to use it without the guide device. A radial adjustment of the working tool is also feasible in this manner and also due to the releasable mounting of the guide rods on the connecting piece 7. The apparatus is especially suitable for the working of wood and similar materials. The compass point 6 is pressed against a reference surface, such as the workpiece.

To support the weight of the manual planing machine and to obtain a uniform profile, a sliding block 12 may further be provided. This sliding block includes two bore holes 13a and 13b, through which the guide rods are inserted. Fastening is achieved by means of threaded bolts 14a and 15b. As seen in particular in FIG. 1, the sliding block comprises a lower part 15 which has a sliding surface resting on the workpiece 1, and an upper part 16. Bolts 17a and 17b (FIG. 2) are fastened to the lower part and are passed through vertical bore holes of the upper part. The left-hand partial section through the sliding block in FIG. 1 depicts the same sliding block. It is further seen therein that a plate 18 is mounted on the upper end of the bolt. Between the plate 18 and the surface of the upper part 16, a compression spring 19 is arranged. This compression spring biases the upper part 16 in the direction of the lower part 15.

A threaded bolt 20 is screwed into a threaded bore hole of the upper part 16. This threaded bolt is visible in FIG. 2 and also in the right-hand cross-section through the sliding block in FIG. 1. The threaded bolt 20 bears against the lower part 15 and may be adjusted by a manual handle 21 or the like. This threaded bolt 20 therefore defines the vertical distance between the two parts 15, 16 of the sliding block. During the inward screwing of the threaded bolt 20, the upper part 16 moves upwardly, so that the working depth is reduced. The process is reversed by screwing the threaded bolt outwardly. The compression springs 19 assure that the lower end of the threaded bolt 20 remains in contact with the lower part 15.

This configuration of the sliding block 12 thus provides the possibility of an adjustment in height for the working tool in a direction B (FIG. 1) perpendicular to the workpiece. The working depth may therefore be adjusted continuously.

If the guide rods 4a and 4b are protruding through the housing of the manual planing machine 2 and furthermore profiling is to be effected not at the edge of the workpiece but instead in its center area, it is also possible to arrange the sliding block on the ends of the guide rods 4a and 4b protruding from the housing of the manual planing machine. This position of the sliding block is shown by broken lines and is designated by 22. The sliding block 22 has the same configuration as the sliding block 12. The arrangement of the sliding block radially outside the manual planing machine assures a particularly high stability of the assembly, as in this case, the manual planing machine is contained between two support points, i.e., the compass point and the outer sliding block. It is obviously also possible to use two sliding blocks simultaneously as shown by 12 and 22.

Figure 3:
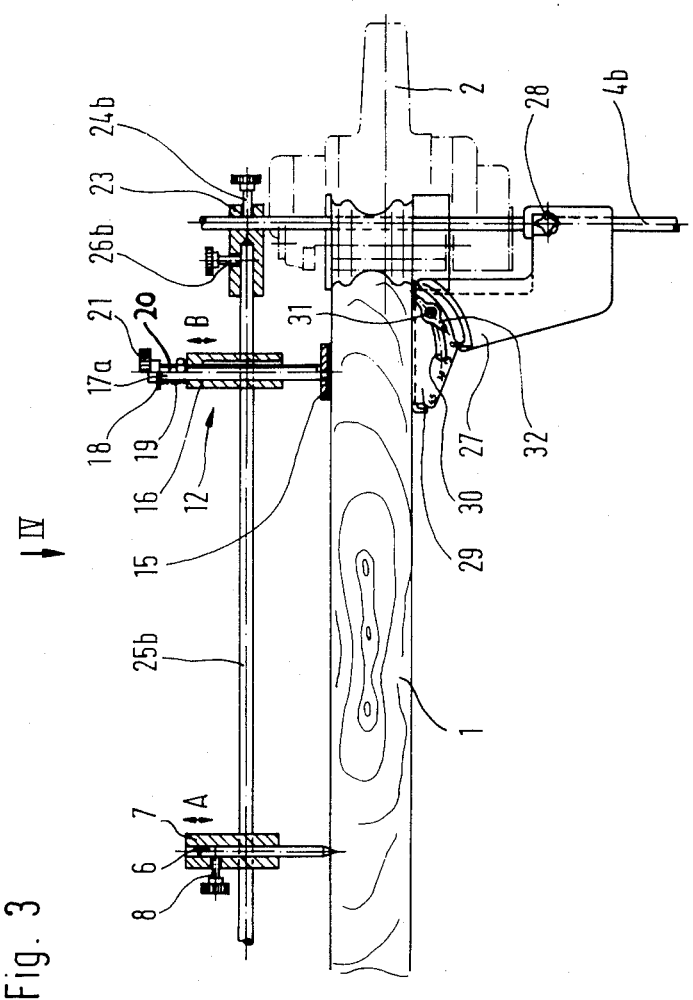
FIG. 3 is a cross-sectional view through a second embodiment of the invention.
Figure 4:
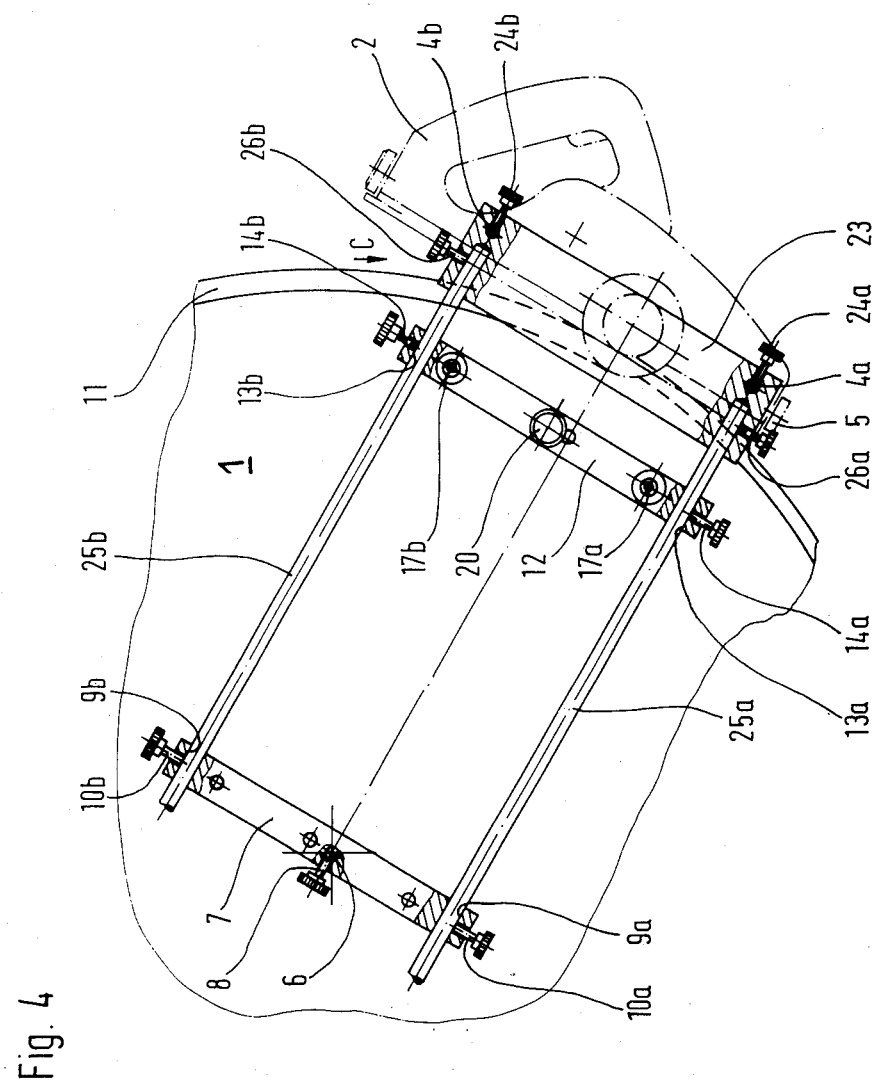
FIG. 4 is a top view of the embodiment of FIG. 3 viewed in the direction of the arrow IV in FIG. 3.

FIGS. 3 and 4 show a further possible application of the guide device corresponding to FIGS. 1 and 2. The reference numerals are retained in part.

These figures illustrate the use of a manual planing machine for the processing of the edges of a workpiece. This requires an angle piece 23 comprising two vertical and two horizontal bore holes. The guide rods 4a and 4b connected with the working tool, are inserted through the vertical bore holes and secured by means of threaded bolts 24a and 24b. The releasable fastening mode renders possible an adjustment in height of the working tool. Additional rods 25a and 25b are inserted into the horizontal bore holes, which are in the form of blind holes, with the rods being secured therein by threaded bolts 26a and 26b. The rods 25a and 25b are passed in through the bores 9a and 9b of the connecting piece 7 and secured therein.

The configuration shown makes it possible further to work the edges of circular or circular segment-shaped bodies. The adjustment in height of the manual planing machine is effected herein by the displacement of the working tool along the guide rods 4a and 5b or by the displacement of the rods in relation to the angle piece 23, while radial adjustments are made by displacing the rods 25a and 25b with respect to the connecting piece 7.

In this embodiment, a height adjustable sliding block 12 is conveniently provided. It is possible, however, to provide a further sliding block 27, which is placed at the ends of the guide rods 4a and 4b protruding downward from the manual planing machine 2, again by means of bore holes, and which is secured by means of threaded bolts to the guide rods, with one of the threaded bolts in FIG. 3 being designated for example by 28. The additional sliding block 27 comprises a support part 29 abutting with a sliding surface against the bottom side of the workpiece and adjustable by means of a connecting link 30, a threaded bolt 31 and a wing nut 32 in relation to the sliding block 27 itself.

The additional sliding block 27 makes possible, together with the sliding block 12, a bilateral guidance of the manual planing machine with respect to the workpiece. The manual planing machine is thereby guided in a highly secure manner. It is further possible, by a pivoting of the support part 29, to contact the latter with workpieces that are not flat or not exactly horizontal. This may occur, for example, if there are already profiles on the bottom side of the workpiece 1. The direction of advance of the manual planing machine 2 is indicated in FIGS. 2 and 4 by C.

Figure 5:
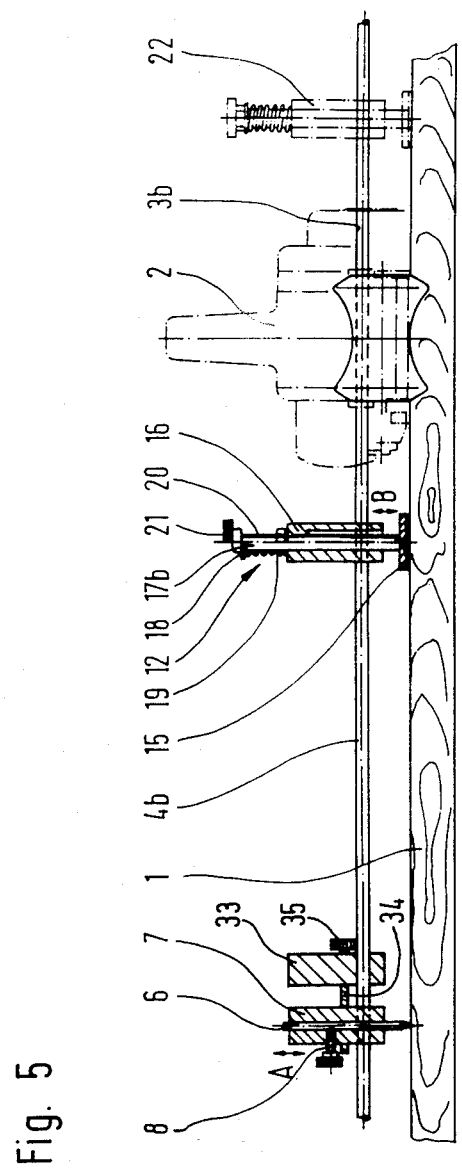
FIG. 5 is a cross-sectional view according to FIG. 1 with means for effecting an additional fine adjustment of the compass point.

FIG. 5 depicts a cross-section through an embodiment similar to that of FIG. 1, but with an additional device for the fine adjustment of the working radius. In that regard, a second connecting piece 33 is provided, which in a manner similar to the first connecting piece 7, is equipped with continuous bore holes, into which the guide rods 4a and 5b may be inserted. These bore holes are continuous throughout, but this is not absolutely necessary; if the second connecting piece 33 were positioned to the left of the first connecting piece 7 (FIG. 5), blind holes would be sufficient.

The second connecting piece 33 is clamped tightly on the guide rods 4a and 4b by means of threaded bolts (not shown). The two connecting pieces 33 and 7 are interconnected by means of a threaded spindle 34 equipped with a manual handle, with the spindle being guided in a threaded bore hole (not shown in FIG. 5 as it is not in the sectional plane therein). In the second connecting piece 33 the threaded spindle 34 is supported rotatingly but not displaceable axially, e.g., the section of the threaded spindle 34 passing through the second connecting piece 33 may be unthreaded, with the corresponding bore hole of the second connecting piece 33 adapted exactly to the diameter of the spindle.

The fine adjustment of the working radius may be effected in a simple manner with this device. The second connecting piece 33 is mounted with its threaded bolts on the guide rods 4a and 5b, while the threaded bolts of the first connecting piece 7 are released. Subsequently, the connecting piece 7 and thereby also the compass point 6, may be displaced by movement of the manual handle 35 of the threaded spindle 34 in the radial direction. The connecting piece 7 is thereby passed through the threads of the threaded spindle 34. Subsequently, in order to increase stability, the connecting piece 7 may be immobilized on the guide rods 4a and 5b by tightening its threaded bolts; this, however, is not absolutely necessary, it is even possible to completely remove the threaded bolts of the connecting piece 7. In this case, even the threaded bore holes for the bolts may be eliminated.

Although the invention has been described in connection with preferred embodiments thereof, it will be appreciated by those skilled in the art that additions, modifications, substitutions, and deletions, not specifically described, may be made without departing from the spirit and scope of the invention as defined by the appended claims.

What is claimed is:

1. Guide device in combination with a mobile working tool such as a manual planing machine or a manual milling machine for processing a workpiece, said tool including a housing provided with a pair of orifices arranged transversely to the direction of advance of the tool, a pair of guide rod means extending through said orifices, respectively, to permit said housing to be slidable along both said guide rod means, first clamping means for releasably clamping said housing to both said guide rod means, a connecting piece provided with a pair of holes into which said guide rod means are inserted, respectively, to permit said connecting piece to be slidable along both said guide rod means, second clamping means for releasably clamping said connecting piece to both said guide rod means so that the distance between said housing and said connecting piece may be varied by unclamping and sliding either of said housing and said connecting piece relative to said guide rod means, a compass point carried by said connecting piece so that said pair of guide rod means and said tool may travel about said compass point as an axis of rotation, a block carried by said pair of guide rod means in spaced relation to said tool, said tool and said block being spaced in the same direction from said compass point, said block including a support surface for slidably engaging a reference surface, said support surface being adjustable in height to control the height of the tool relative to the workpiece, said block being slidable along both said guide rod means, and third clamping means releasably clamping said block to both said guide rod means.

2. Apparatus according to claim 1, wherein said block includes a lower part and an upper part, said lower part including said support surface and carrying at least two pins which protrude upwardly through holes in said upper part, plates being mounted on upper ends of said pins, compression springs positioned around said pins between said plates and said upper part to bias said upper part toward said lower part, said upper part including a threaded bolt threadedly mounted at one end in said hole bearing against said lower part at its other end, such that said upper and lower parts can be mutually separated in response to rotation of said bolt in one direction.

3. Apparatus according to claim 1, wherein said block is arranged between said working tool and said compass point.

4. Apparatus according to claim 1, wherein said block is situated on a side of said tool which is opposite the side on which said compass point is disposed.

5. Apparatus according to claim 1, wherein said guide device includes a second block situated on a side of said tool which is opposite the side on which said first-named block is disposed.

6. Apparatus according to claim 1 including an angle piece containing at least two bore holes oriented perpendicularly to one another, each of said guide rod means including first and second guide rods, one of said guide rods mounted in one of said connecting piece and in one of said bore holes of said angle piece, the other of said guide rods connected to the other of said bore holes, said tool being carried by said second guide rod.

7. Apparatus according to claim 6, wherein said block being mounted on said second guide rods on a side of said tool opposite said angle piece.

8. Apparatus according to claim 6, wherein said connecting piece comprises a first part carrying said compass point, and a second part connected to said first part by an adjustment member, said first and second parts being mounted on said first guide rods, said second part being affixed to said first guide rods, and said first part being slidable along said first guide rods in response to actuation of said adjustment member.

9. Apparatus according to claim 8, wherein said adjustment member comprises a threaded pin.

10. Apparatys according to claim 1, wherein said tool is motor driven and includes a rotatable cutting member.

11. Apparatus according to claim 1, wherein said first clamping means comprises a pair of rotatable threaded bolts threadedly connected to said housing for adjustment perpendicularly to the axes of said guide rod means for releasably clamping said housing to said guide rod means, said second clamping means comprising a pair of rotatable threaded bolts threadedly connected to said connecting piece for adjustment perpendicularly to the axes of said guide rod means for releasably clamping said connecting piece to said guide rod means.

12. Guide device in combination with a mobile working tool such as a manual planing machine or a manual milling machine for processing a workpiece, said guide device comprising at least one guide rod mounted on said tool, a compass point operably connected to said guide rod at a location remote from said tool whereby said guide rod and tool may be permitted to travel about said compass point as an axis of rotation, said guide device including a block spaced from said tool and said compass point and including a support surface for slidably engaging a reference surface to control the location of said tool relative to the workpiece, said block including a lower part and an upper part, said lower part including said support surface and carrying at least two pins which protrude upwardly through holes in said upper part, plates being mounted on upper ends of said pins, compression springs positioned around said pins between said plates and said upper part to bias said upper part toward said lower part, said upper part including a threaded bolt threadedly mounted at one end in said hole bearing against said lower part at its other end, such that said upper and lower parts can be mutually separated in response to rotation of said bolt in one direction.

* * * * *